US011340633B2

(12) United States Patent
Heard et al.

(10) Patent No.: US 11,340,633 B2
(45) Date of Patent: May 24, 2022

(54) SYSTEM AND METHOD FOR ADJUSTABLE BALLAST

(71) Applicant: Bell Textron Inc., Fort Worth, TX (US)

(72) Inventors: Derek William Heard, Fort Worth, TX (US); Richard Theodore Perryman, Fort Worth, TX (US); Nathan Craig Clark, Arlington, TX (US); Joshua Andrew Emrich, Grapevine, TX (US); Yann Lavallee, St-Hippolyte (CA); Ralph Michael Gannarelli, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 533 days.

(21) Appl. No.: 16/555,655

(22) Filed: Aug. 29, 2019

(65) Prior Publication Data

US 2021/0064061 A1 Mar. 4, 2021

(51) Int. Cl.
*B64C 17/08* (2006.01)
*G05D 1/08* (2006.01)

(52) U.S. Cl.
CPC ........... *G05D 1/0816* (2013.01); *B64C 17/08* (2013.01)

(58) Field of Classification Search
CPC ......... B64C 17/08; B64C 17/02; B64C 17/00; B64C 17/04; B64B 1/38; B64B 1/70
See application file for complete search history.

(56) References Cited

U.S. PATENT DOCUMENTS

| 9,415,870 | B1 | 8/2016 | Beckman et al. |
| 9,908,619 | B1 | 3/2018 | Beckman et al. |
| 10,913,528 | B1* | 2/2021 | Moore ................ B64C 29/0033 |
| 11,001,373 | B2* | 5/2021 | Heard ..................... B64C 17/08 |
| 11,148,786 | B2* | 10/2021 | Heard ..................... B64C 17/08 |
| 2021/0124373 | A1* | 4/2021 | Miller ..................... B64C 17/02 |

FOREIGN PATENT DOCUMENTS

KR 1020120076208 A 7/2012

OTHER PUBLICATIONS

Heard, Derek William, et al.; "System and Method for Adjustable Ballast"; U.S. Appl. No. 16/555,515, filed Aug. 29, 2019.
Cabka Gmbh & Co.;"Ballast plate"; XP055688023; https://cabka.com/global/en/m/products/produktuebersicht/produktdetails/pk/Produkt/details/965/; Feb. 6, 2017 [retrieved on Apr. 21, 2020]; 1 page.
U.S. Department of Transportation, Federal Aviation Administration; "Aircraft Weight and Balance Handbook—FAA-H-8083-1A"; XP055687905; https://skybrary.aero/bookshelf/books/879.pdf; Jul. 29, 2014 [retrieved on Apr. 21, 2020]; 97 pages.

* cited by examiner

*Primary Examiner* — Richard R. Green
*Assistant Examiner* — Madison Elizabeth Dittner
(74) *Attorney, Agent, or Firm* — Shackelford, Bowen, McKinley & Norton, LLP

(57) ABSTRACT

A method of adjusting a center of gravity (CG) of an aircraft includes: inputting at least one load parameter into a flight computer, determining, via a processer of the flight computer, the CG of the aircraft. Responsive to a determination by the processor that the CG is outside of a CG envelope, moving at least a first movable ballast of a plurality of movable ballasts from a first ballast dock to a second ballast dock to move the CG toward the CG envelope. Each of the first and second ballast docks may include a housing and a first ballast tray secured within the housing and comprising a plurality of channels.

17 Claims, 6 Drawing Sheets

SYSTEM AND METHOD FOR ADJUSTABLE BALLAST

BACKGROUND

This section provides background information to facilitate a better understanding of the various aspects of the disclosure. It should be understood that the statements in this section of this document are to be read in this light, and not as admissions of prior art.

Aircraft often require the use of ballast to ensure that the center of gravity (CG) of the aircraft is within a CG envelope for that particular aircraft. The CG envelope is a bounded area or volume within which the CG of the aircraft should be positioned in order to maintain desirable flight characteristics. In some aspects, the CG envelope may be a two dimensional area. For example, the CG envelope may be a two dimensional plane passing through the mast of rotorcraft 10 with the x-axis running nose to tail and the y-axis being parallel to the mast. In some aspects, the CG envelope may be a three dimensional volume that adds a z-axis that is perpendicular to the x-axis. When loading up the aircraft with passengers, cargo, and the like, the CG of the aircraft changes. In some situations, the CG can change so much that the CG moves outside of the aircraft's CG envelope and the aircraft's flight characteristics are negatively affected. In order to maintain desirable flight characteristics, it is important that the CG stay within the desired CG envelope.

Modern aircraft often have flight control computers that monitor various aspects of the aircraft. Some flight control computers have the ability to calculate the CG based upon information input by a pilot. This information can include aircraft configuration information (e.g., number and location of seats installed), passenger information (e.g., passenger weight and location), cargo information (e.g., weight and location), and the like. Upon inputting this data, the flight control computer determines the approximate CG of the aircraft. If necessary, the pilot can adjust the CG by making adjustments to one or more of the passenger position, cargo position, and the like to adjust the center of gravity. However, in some instances such adjustments are not desirable or practical.

Some aircrafts include fixed ballasts to manipulate the CG of the aircraft. Fixed ballasts can technically be removed and/or added, but doing so requires a certified mechanic due to the amount and type of work required. Furthermore, removal/addition of fixed ballasts is often impractical or impossible. As a workaround, some pilots add temporary ballast to the aircraft, such as sandbags or water jugs, to alter the CG. Adding temporary ballast to the aircraft can be problematic. For example, the aircraft may fly from a first location to a second location to drop off cargo or passengers. For the return flight from the second location to the first location, the CG of the aircraft may have changed significantly. To address the CG change, the pilot needs to add ballast to the aircraft. The problem with using temporary ballast is that the pilot may not have access to temporary ballast at the second location. The inverse is also true. For example, if the aircraft flies from the first location to the second location to pick up cargo or passengers, the aircraft may require temporary ballast on the way to pick up the cargo or passengers. When returning from the second location to the first location, the temporary ballast may no longer be needed. The pilot must then leave the ballast behind or use up some of the aircraft's cargo capacity (both weight and volume) with the temporary ballast.

SUMMARY

An example of a method of adjusting a center of gravity (CG) of an aircraft includes: inputting at least one load parameter into a flight computer, determining, via a processor of the flight computer, the CG of the aircraft. Responsive to a determination by the processor that the CG is outside of a CG envelope, moving at least a first movable ballast of a plurality of movable ballasts from a first ballast dock to a second ballast dock to move the CG toward the CG envelope. Each of the first and second ballast docks may include a housing and a first ballast tray secured within the housing and comprising a plurality of channels.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
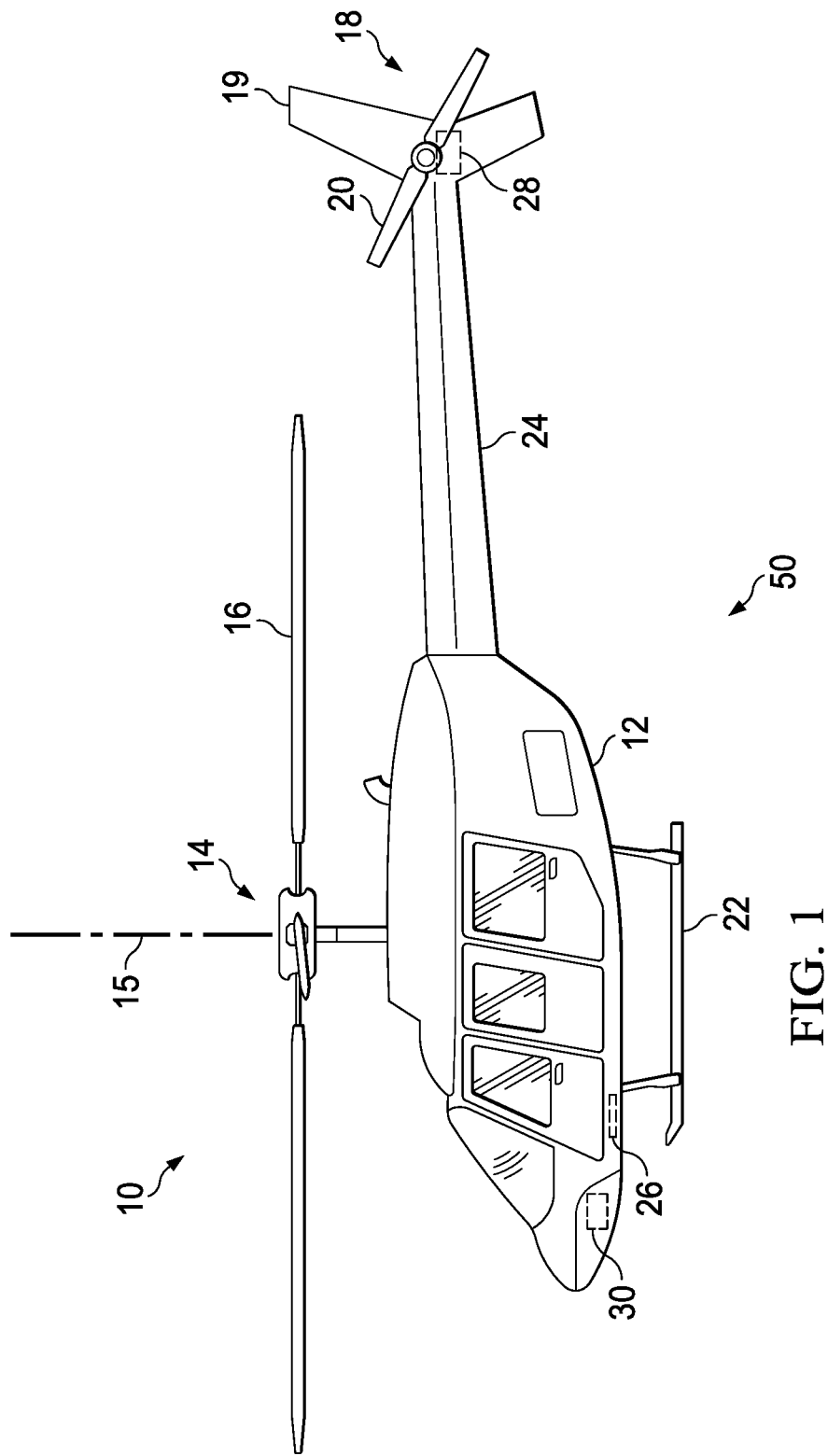
FIG. 1 illustrates a rotorcraft in accordance with aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1 illustrates an example of a rotorcraft 10. Rotorcraft 10 includes a fuselage 12, a main rotor system 14 with rotor blades 16, and a tail rotor system 18 with tail rotor blades 20. An engine within fuselage 12 supplies main rotor system 14 and tail rotor system 18 with torque to rotate rotor blades 16 and tail rotor blades 20. As illustrated in FIG. 1, rotorcraft 10 includes four rotor blades 16. In other aspects, rotorcraft 10 could include as few as two or three rotor blades 16 or more than four rotor blades 16 (e.g., five, six, etc.). Landing gear 22 extend from fuselage 12 and support rotorcraft 10 when rotorcraft 10 is landing or when rotorcraft 10 is at rest on the ground. Rotorcraft 10 includes a flight control computer 30 configured monitor and control aspects of rotorcraft 10. Rotorcraft 10 is not meant to be limiting. Aspects of the disclosure apply to other rotorcraft as well.

Rotorcraft 10 includes a movable ballast system 50 that includes a fore ballast dock 26 and an aft ballast dock 28. The terms fore and aft are used to indicated that fore ballast dock 26 is located forward of aft ballast dock 28 and aft ballast dock 28 is located rearward of fore ballast dock 26. Movable ballast system 50 allows the CG of rotorcraft 10 to be adjusted by selectively placing ballasts into fore ballast dock 26 and aft ballast dock 28. For example, the CG of rotorcraft 10 can be moved forward by placing ballasts into fore ballast dock 26 and the CG rotorcraft 10 can be moved rearward by placing ballasts into aft ballast dock 28.

Fore ballast dock 26 is typically located fore of an axis 15 of the mast of main rotor system 14. In some aspects fore ballast dock 26 is located fore of the CG of rotorcraft 10. In some aspects, fore ballast dock 26 may be located under a pilot or co-pilot seat. Placing fore ballast dock 26 under the pilot or co-pilot seats provides easy access to fore ballast dock 26. In other aspects, fore ballast dock 26 may be located in another location within fuselage 12 (e.g., in or near a foot well of the pilot or co-pilot, secured to a seatback of the pilot or co-pilot, on the ceiling, and the like). In other aspects, fore ballast dock 26 may be located on an underside of fuselage 12.

Aft ballast dock 28 is typically located aft of axis 15 of the mast of main rotor system 14. In a typical aspect, aft ballast dock 28 is located aft of the CG of rotorcraft 10. In some aspects, aft ballast dock 28 is located aft of the CG of rotorcraft 10 (e.g., proximal to tail rotor system 18) and fore ballast dock 26 is located proximal to the CG of the aircraft (e.g., fore ballast dock 28 may be located close to but fore or aft of the CG of the aircraft). In various aspects, aft ballast dock 28 is secured to tail fin 19 or tail boom 24 of rotorcraft 10. As illustrated in FIG. 1, aft ballast dock 28 is located proximal to tail rotor system 18. In other aspects, aft ballast dock 28 may be located at a position anywhere along tail boom 24 or in or on fuselage 12 that is rearward of axis 15. Positioning aft ballast dock 28 farther rearward provides more leverage for the ballast in aft ballast dock 28, which increases the ballast effect of aft ballast dock 28.

Movable ballast system 50 is shown illustrated with rotorcraft 10. Those of skill in the art will recognize that movable ballast system 50 could be implemented on other aircraft including tiltrotors and airplanes. For example, when used with an airplane, fore ballast dock 26 may be located fore of a CG of the aircraft and aft ballast dock 28 may be located aft of the CG of the aircraft (e.g., proximal to the tail of the aircraft)

Figure 2:
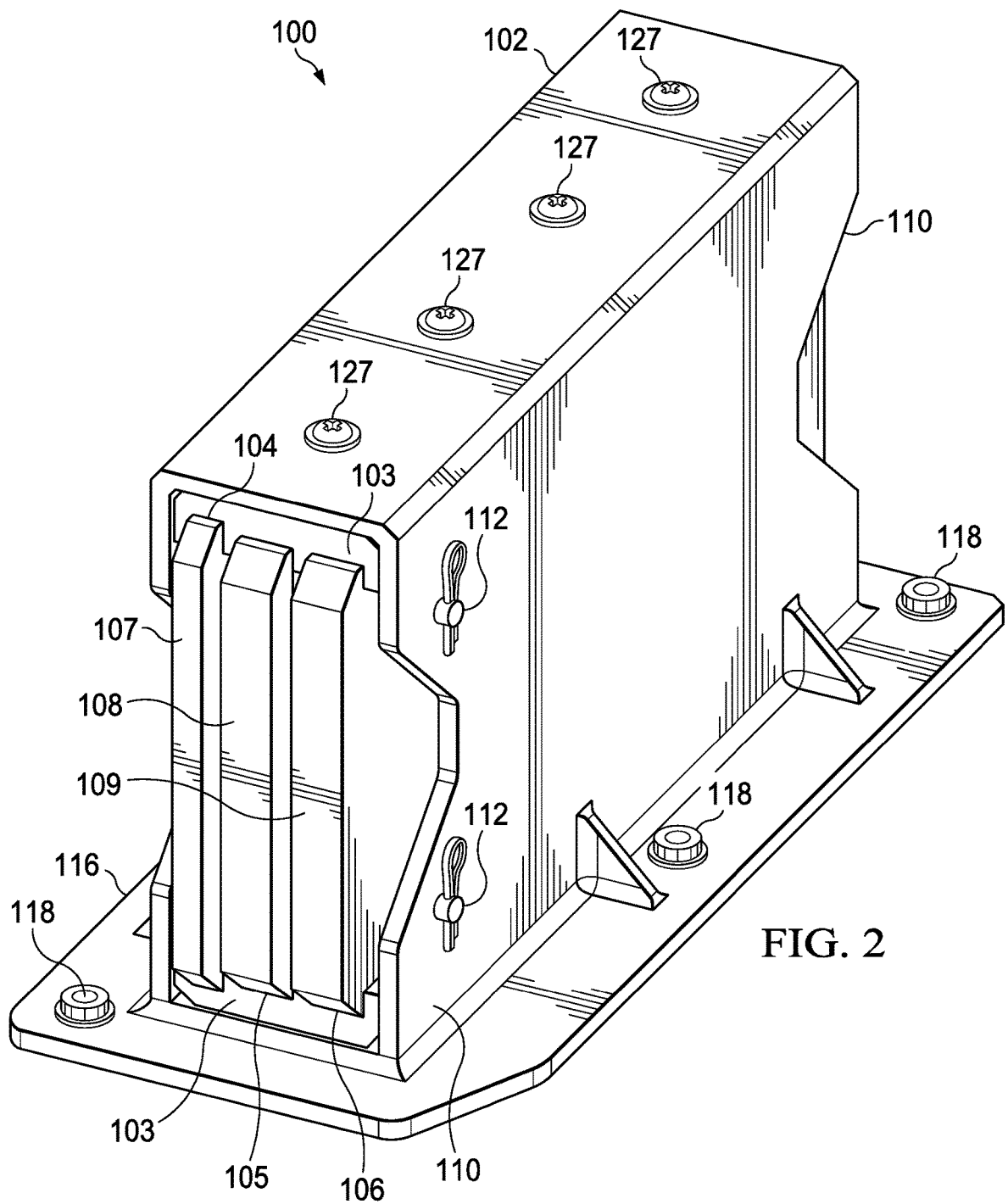
FIG. 2 illustrates a ballast dock in accordance with aspects of the disclosure.

FIG. 2 is a perspective view illustrating a ballast dock 100 according to aspects of the disclosure. Ballast dock 100 may be used as either or both of fore ballast dock 26 and aft ballast dock 28 of FIG. 1. Ballast dock 100 includes a housing 102 that is configured to receive removable ballast. In some aspects, a shroud (e.g., similar to shroud 220 of FIG. 6) optionally covers housing 102 to improve aesthetics of ballast dock 100. In some aspects, the shroud may be included on fore ballast dock 26 and excluded on aft ballast dock 28. Housing 102 includes cut outs 110 that expose a portion of movable ballasts 107-109 when movable ballasts 107-109 are inserted in ballast dock 100. Cut outs 110 make it easier for a user (e.g., a pilot) to see which, if any, movable ballasts 107-109 are inserted into movable dock 100 and to grip movable ballasts 107-109 for removal from housing 102.

Housing 102 includes ballast trays 103 secured within a cavity of housing 102 that form bays 104-106. Ballast trays 103 are secured to housing 102 via fasteners 127. Bays 104-106 are configured to receive movable ballasts 107-109, respectively. Each movable ballast of movable ballasts 107-109 is a plate that slides into and out of bays 104-106, respectively. Each of movable ballasts 108 and 109 are similar to movable ballast 107 but may have slightly different dimensions. Movable ballasts 107-109 can be made of various materials. In various aspects, movable ballasts 107-109 are made from dense materials (e.g., tungsten, steel, and the like) to provide more weight per volume so that a size of movable ballast system 50 can be minimized. In some aspects, each of bays 104-106 and movable ballasts 107-109, respectively, are complementarily shaped such that movable ballast 107 only fits in bay 104, movable ballast 108 only fits in bay 105, and movable ballast 109 only fits in bay 106. For example, each movable ballast 107-109 has a unique thickness t and width w that is complemented by each bay 104-106 to prevent a user from placing a ballast in the incorrect bay. Each channel of ballast tray 103 includes complementary depth d and thickness t to receive movable ballasts 107-109. Dimensioning each movable ballast with unique dimensions allows a user to visually recognize which movable ballasts—and thus which weights—are inserted into ballast dock 100. In other aspects, each bay 104-106 and movable ballast 107-109 may include the same dimensions, allowing any of movable ballasts 107-109 to be placed into any of bays 104-106. Although FIG. 2 illustrates three bays and three ballasts, it will be appreciated that fewer than three bays and three ballasts or more than three bays and three ballasts may be included.

In the aspect illustrated in FIG. 2, movable ballast 107 has a first weight and movable ballasts 108 and 109 have a second weight, with the first weight being less than the second weight. For example, the first weight may be five pounds and the second weight may be ten pounds (i.e., a combined weight of movable ballasts 107-109 would be twenty five pounds). In other aspects, each movable ballast 107-109 may have a different weight. In other aspects, each of the first, second, and third weights may be the same.

Figure 3:
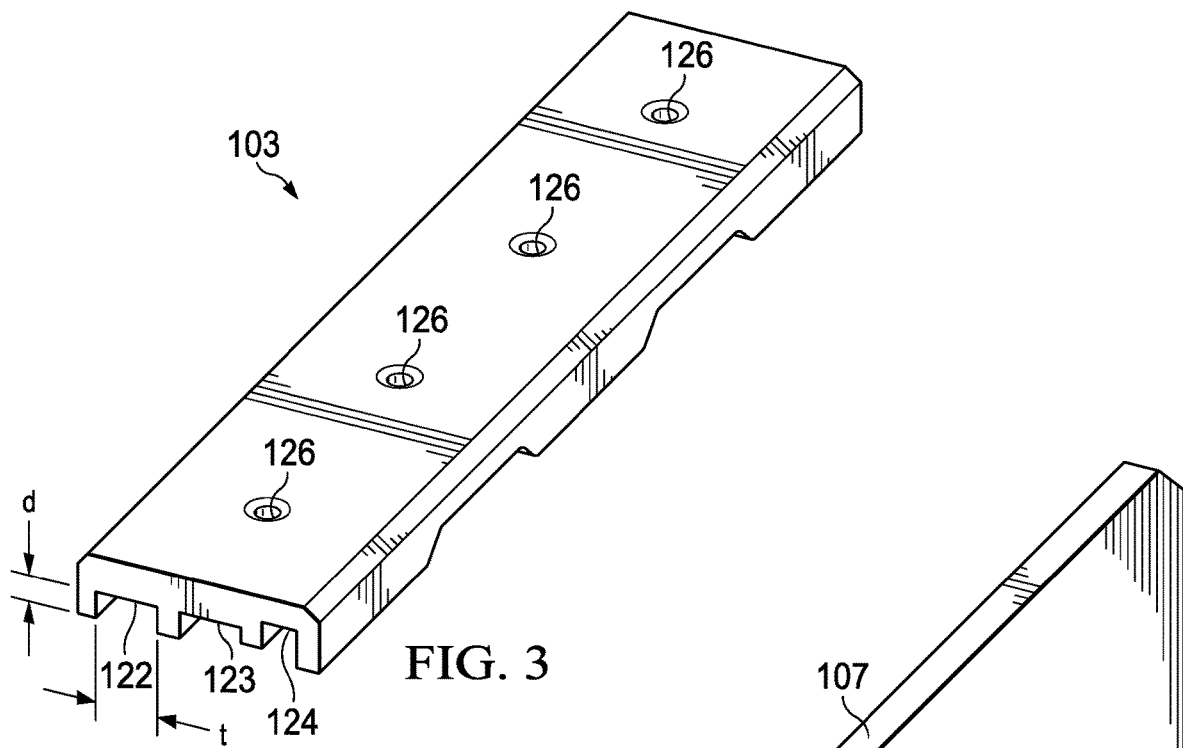
FIG. 3 illustrates a ballast tray in accordance with aspects of the disclosure.

FIG. 3 illustrates ballast tray 103 according to aspects of the disclosure. As illustrated in FIG. 2, ballast dock 100 includes two ballast trays 103. Ballast trays 103 are mirrors of each other. Only one ballast tray 103 will be discussed with the understanding that the discussion applies to both ballast trays. Ballast tray 103 includes channels 122-124 that are configured to receive a side of movable ballasts 107-109.

For example, each channel 122-124 is dimensioned to accommodate the thickness and width of movable ballasts 107-109. Opposing channels 122-124 of the two ballast trays 103 form bays 104-106. Ballast tray 103 includes one or more bores 126 that receive fasteners 127 (e.g., screws, bolts, pins, and the like) to secure ballast tray 103 to housing 102.

In some aspects, ballast tray 103 is made from or coated with a non-metallic material to reduce the likelihood of movable ballasts 107-109 rattling within housing 102. For example, ballast tray 103 may be made from rubbers, plastics, polymers and the like. Coatings can be applied to a surface of ballast tray 103. Coating materials include rubbers, plastics, polymers, fabrics, textiles, and the like. In some aspects, movable ballasts 107-109 may be coated with a material to reduce the likelihood of movable ballasts 107-109 rattling within housing 102. Coating materials include rubbers, plastics, polymers, fabrics, textiles, and the like.

In some aspects, ballast dock 100 includes a single ballast tray 103. In aspects with only a single ballast tray 103, channels 122-124 are dimensioned so that opposite edges of movable ballasts 107-109 abut an opposite side of housing 102 so that movable ballasts 107-109 are retained securely within housing 102 to prevent movable ballasts from rattling inside housing 102.

Figure 4:
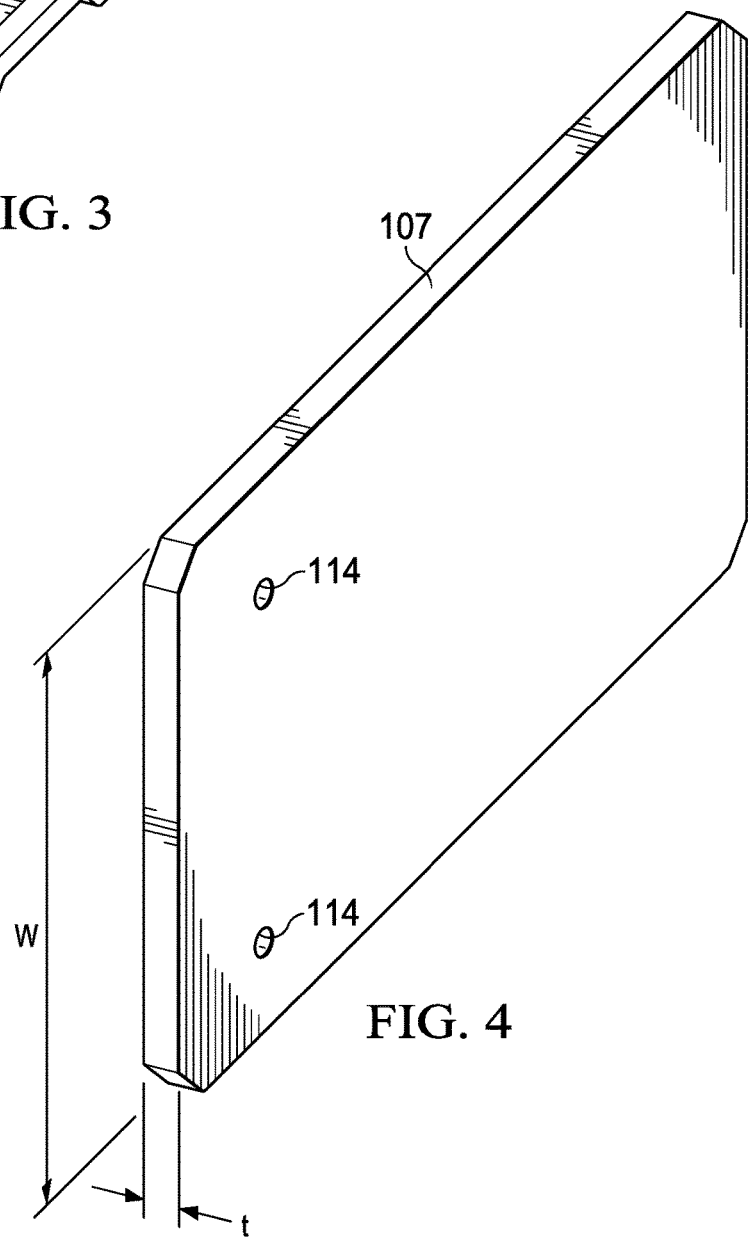
FIG. 4 illustrates a ballast in accordance with aspects of the disclosure.

Movable ballasts 107-109 are further secured within housing 102 by pins 112 that pass through coaxially aligned bores formed through housing 102 and movable ballasts 107-109. FIG. 4 illustrates bores 114 formed through movable ballast 107. Similar bores are formed through each of movable ballasts 108 and 109. Pins 112 lock in place any of movable ballasts 107-109 that are placed into housing 102. In some aspects, each pin 112 passes through a top of housing 102 and a bottom of housing 102. In various aspects, ballast dock 100 may include only one pin 112 or more than two pins 112.

Ballast dock 100 includes a mounting plate 116 that facilitates mounting ballast dock 100 to rotorcraft 10. As illustrated in FIG. 2, mounting plate 116 includes bores to accommodate fasteners 118 that are used to secure ballast dock 100 to, for example, a wall or floor within fuselage 12 or another part of the airframe of rotorcraft 10. Fasteners 118 may be screws, bolts, pins, and the like. In some aspects, ballast dock 100 is secured to a portion of the cabin floor in proximity to pilot's seat to allow the pilot to visibly inspect ballast dock 100 from the pilot's seat. Mounting plate 116 positioned on along a short side of housing 102 so that ballast dock 100 takes up less mounting surface area. In some aspects, mounting plate 116 is integrally formed with housing 102. In some aspects, mounting plate 116 is a separate piece that attaches to housing 102.

Figure 5:
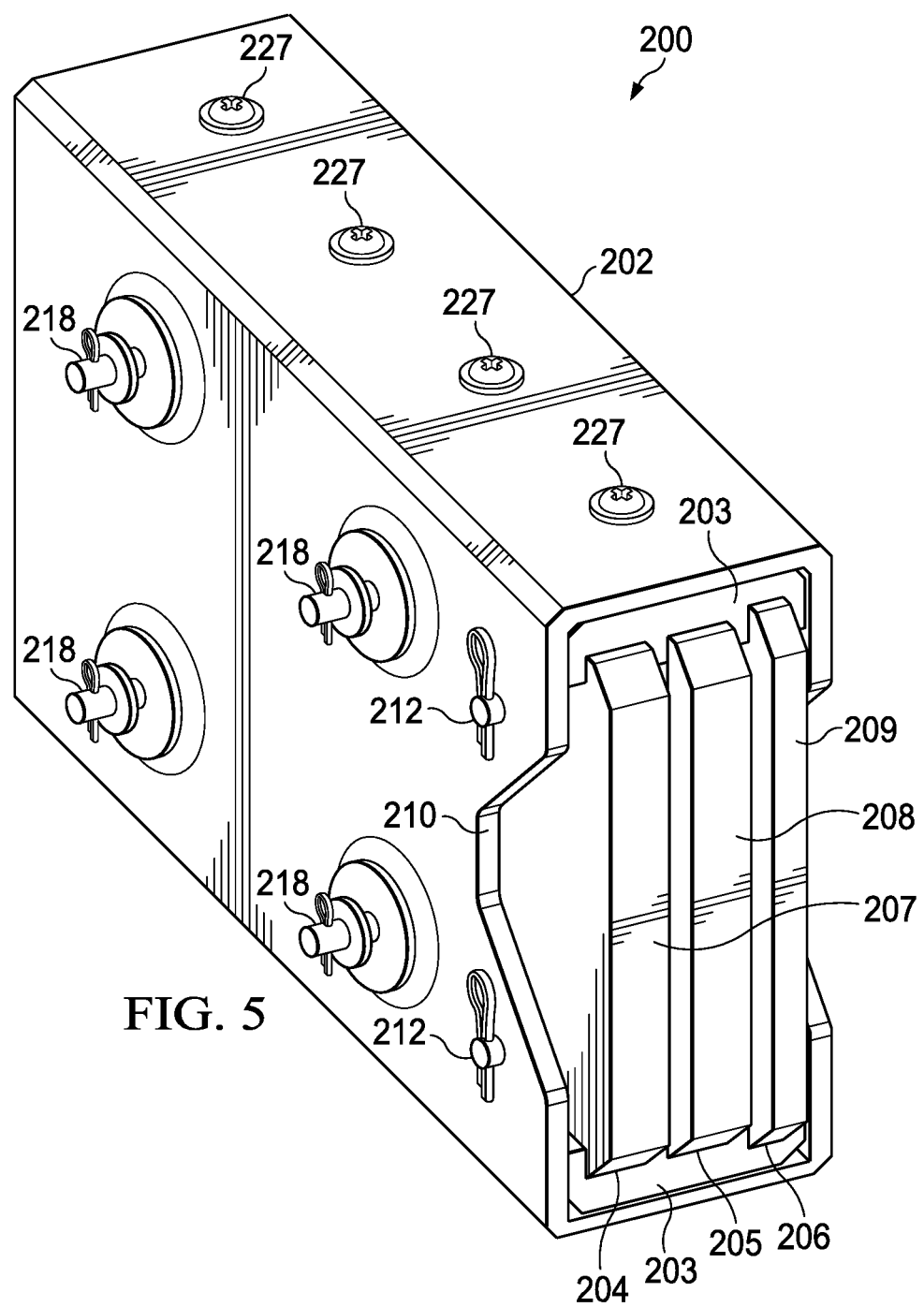
FIGS. 5 and 6 illustrate a ballast dock in accordance with aspects of the disclosure.

FIG. 5 illustrates a ballast dock 200 according to aspects of the disclosure. Ballast dock 200 is similar to ballast dock 100 discussed above and is intended to be used with movable ballasts 107-109 such that movable ballasts 107-109 may be used with either of ballast docks 100 and 200. Similar part numbers are used in FIG. 5 for parts that are similar to those described in FIG. 2. Ballast dock 200 may similarly also be used as either or both of fore/aft ballast dock 26, 28. Ballast dock 200 includes a housing 202 and a shroud 220. Shroud 220 covers housing 202 for aesthetic purposes. Housing 202 includes ballast trays 203 that form bays 204-206. Ballast trays 203 are secured to housing 202 via fasteners 227. Bays 204-206 are configured to receive movable ballasts 107-109. Cut outs 210 provide easier access to movable ballasts 107-109. In the aspect of FIG. 5, each of movable ballasts 107-109 has a different weight, as indicated by their different thicknesses t and widths w. In other aspects, movable ballasts 107-109 could have the same weights and dimensions. In other aspects, movable ballast 107 could have a first weight and each of movable ballasts 108, 109 could have a second weight.

In contrast to ballast dock 100, ballast dock 200 does not include mounting plate 116. Instead, housing 202 attaches to rotorcraft 10 via fasteners 218 that pass through a bottom side of housing 202. Relative to ballast dock 100, ballast dock 200 offers a different mounting configuration to allow for different mounting scenarios. For example, it may be preferable to use ballast dock 100 as fore ballast dock 26 and to use ballast dock 200 as aft ballast dock 28. Other aspects may use either ballast dock 100, 200 as fore ballast dock 26 and/or either ballast dock 100, 200 as aft ballast dock 28.

Figure 6:
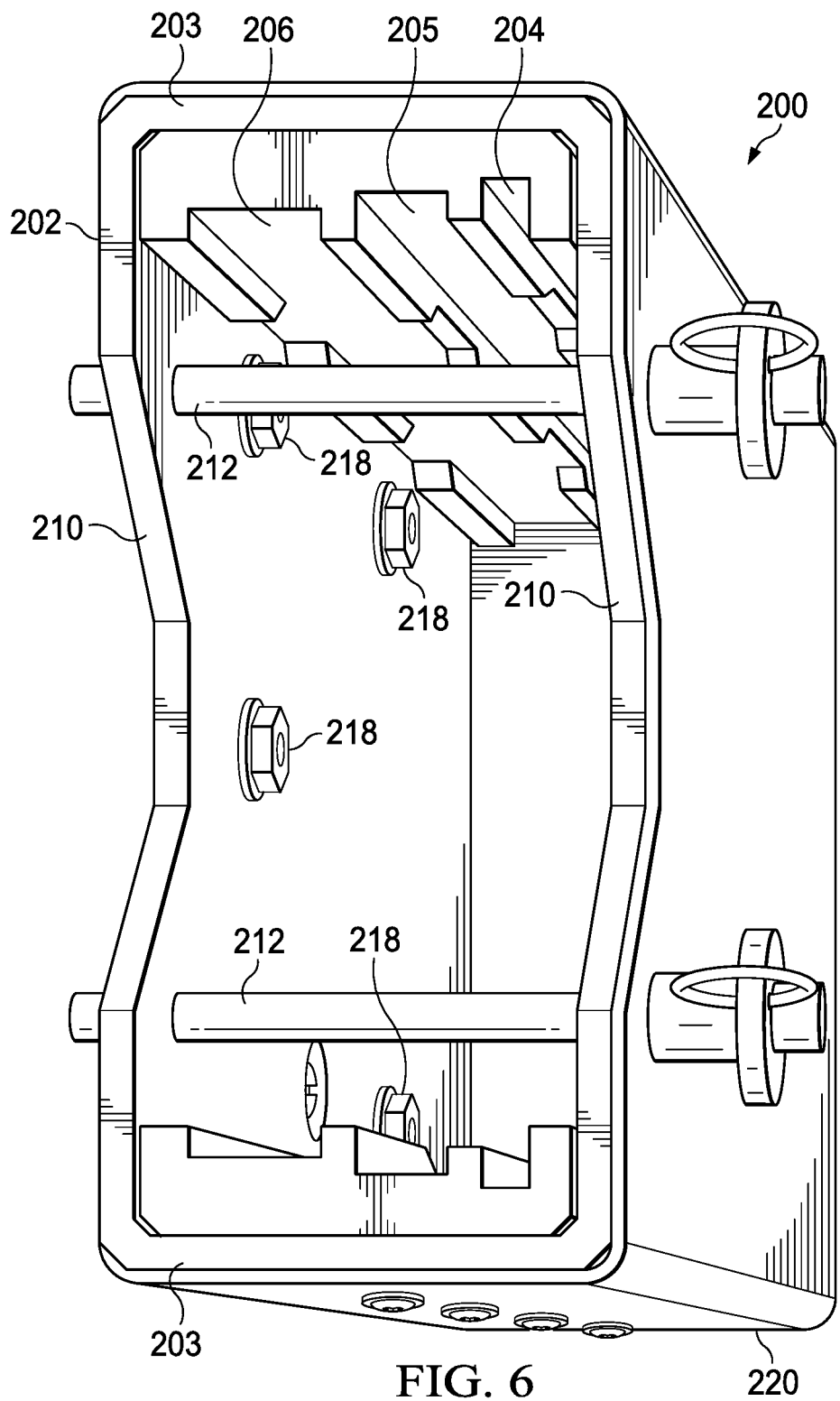

FIG. 6 illustrates an embodiment of ballast dock 200 with movable ballasts 107-109 removed. With movable ballasts 107-109 removed, pins 212 can be seen extending through coaxially aligned bores of housing 202 and shroud 220. FIG. 6 illustrates an exemplary aspect in which each pin 212 extends through a bottom of housing 202. In such an aspect, pins 212 extend through the bottom of housing 202 and into a grommet affixed to fuselage 12. In a typical aspect, the grommets have a diameter that is larger than a diameter of pins 212 so that pins 212 do not contact the grommets, which prevents pins 212 from introducing horizontal shear loads to the floor of fuselage 12.

In an exemplary aspect, fore ballast dock 26 comprises ballast dock 100 and aft ballast dock 28 comprises ballast dock 200. Those having skill in the art will recognize that either of fore/aft ballast docks 26, 28 could be either of ballast docks 100, 200. To alter the CG of rotorcraft 10, a user (e.g., a pilot, ground crew, etc.) can move one or more of movable ballasts 107-109 between fore ballast dock 26 and aft ballast dock 28. For example, in a heavy cabin aspect (e.g., rotorcraft 10 is loaded up with passengers or cargo), the CG of rotorcraft 10 is located relatively forward as a result of the extra weight of the passengers and/or cargo. If the CG shifts too far forward, the flight characteristics of rotorcraft 10 will be altered. For example, a forward CG requires excessive rear cyclic to maintain a hover. To combat a forward CG, the user can insert one or more of movable ballasts 107-109 in aft ballast dock 28 as needed to shift the CG toward the rear of rotorcraft 10. Due to the long lever arm afforded by tail boom 24, adding one or movable more ballasts 107-109 to aft ballast dock 28 can have a large effect upon the location of the CG of rotorcraft 10.

In a light cabin aspect (e.g., rotorcraft 10 is not loaded up with passengers and/or cargo), the CG of rotorcraft 10 is located relatively rearward as a result of the lack of weight from passengers and/or cargo. If the CG shifts too far rearward, the flight characteristics of rotorcraft 10 will be altered. For example, a rearward CG requires excessive forward cyclic to maintain a hover. To combat a rearward CG, the user can insert one or more of movable ballasts 107-109 into fore ballast dock 26 as needed to shift the CG toward the front of rotorcraft 10. Due to the long lever arm afforded by tail boom 24, removing one or more movable ballasts 107-109 from aft ballast dock 28 can have a large effect upon the location of the CG of rotorcraft 10.

In either a heavy or light cabin aspect, movable ballast system 50 allows a user to quickly and easily move one or more of movable ballasts 107-109 between fore/aft ballast docks 26, 28 to adjust the CG of rotorcraft 10. In contrast to movable ballast system 50, conventional rotorcraft have no ballast system or have a fixed ballast system. A fixed ballast system adds ballast to the aircraft by bolting the ballast to the airframe of the aircraft. For example, ballast may be bolted into a tail section of the aircraft. In a heavy cabin scenario, the pilot has no ability to add temporary ballast to the tail section and instead must try to shift cargo etc. to the rear of the cabin and hope that the rearrangement of the cargo is sufficient to address the rearward CG. In a light cabin scenario, the pilot must add temporary ballast (e.g., water jugs or sandbags) to the cabin to counteract the rearward CG problem. Removal of ballast bolted to the tail section is impractical as it requires a certified mechanic to disassemble components of the aircraft to remove the bolted-in ballast.

Compared to conventional ballast setups, movable ballast system 50 is more versatile as it gives the user the ability to shift the CG forward or rearward as needed without the need of such items as sandbags and water jugs for temporary ballast. Relying on temporary ballast can be problematic as a user may not always have convenient access to temporary ballast when needed. For example, if an aircraft flies to a remote destination while loaded up with passengers and/or cargo, the aircraft may be in a heavy cabin scenario with a forward CG where rear ballast is needed. Once the passengers and/or cargo are no longer on board, the aircraft may transition from a heavy cabin to a light cabin with rearward CG. Movable ballast system 50 allows the user to easily place one or more movable ballasts 107-109 into aft ballast dock 28 for the first leg of the trip to counteract the forward CG and to easily place one or more movable ballasts 107-109 into fore ballast dock 26 to counteract the rearward CG for the second leg of the flight. Without movable ballast system 50, it may be difficult for a user to add the needed temporary ballast once the aircraft arrives at the remote location as materials needed for the temporary ballast may not be readily available.

In an opposite scenario, where the aircraft flies to a remote location to pick up passengers and/or cargo, the aircraft may start the journey in a light cabin scenario with a rearward CG. Without movable ballast system 50, the user must place temporary ballast in the cabin to counteract the rearward CG. Once the aircraft arrives at the remote location to pick up the passengers and/or cargo, the temporary ballast is no longer necessary as the aircraft will transition to a heavy cabin scenario. The user must then either leave the temporary ballast behind or take up some of the space and carrying capacity of the aircraft with the temporary ballast, neither of which is desirable.

Figure 7:
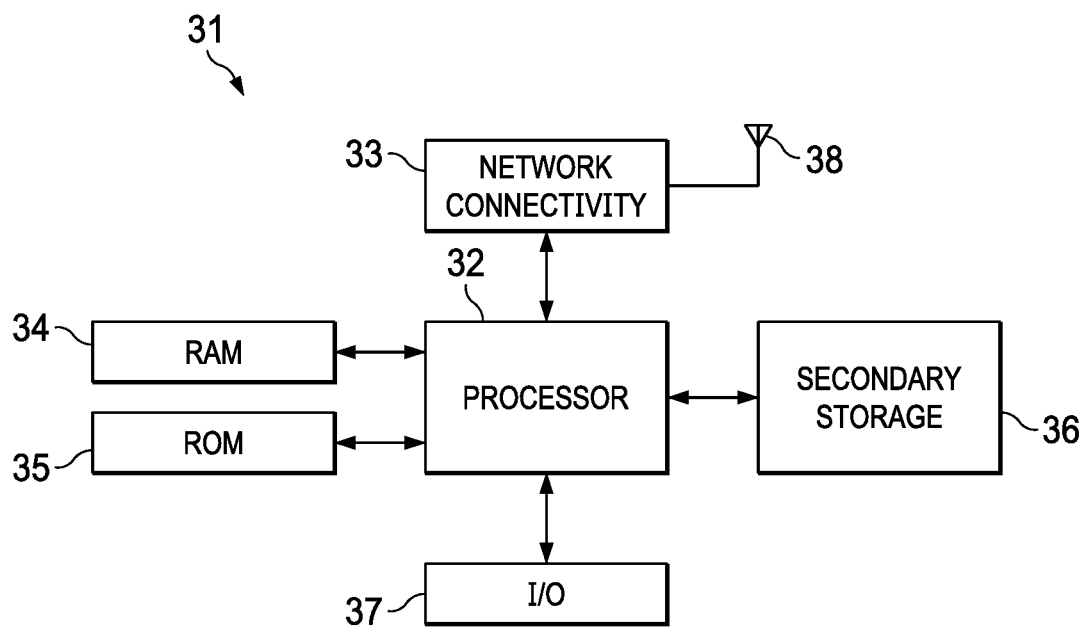
FIG. 7 is a schematic diagram of a general-purpose processor (e.g. electronic controller or computer) system suitable for implementing aspects of the disclosure.

In some aspects, flight control computer 30 calculates a CG of rotorcraft 10 to aid a user in determining placement of movable ballasts 107-109 into fore/aft ballast docks 26, 28. FIG. 7 is a schematic diagram of a general-purpose processor (e.g. electronic controller or computer) system 31 suitable for implementing the aspects of this disclosure is shown. System 31 includes processing component and/or processor 32 suitable for implementing one or more aspects disclosed herein. In some aspects, flight control computer 30 and/or other electronic systems of rotorcraft 10 may include one or more systems 31. In addition to processor 32 (which may be referred to as a central processor unit or CPU), system 31 might include network connectivity devices 33, random access memory (RAM) 34, read only memory (ROM) 35, secondary storage 36, and input/output (I/O) devices 37. In some cases, some of these components may not be present or may be combined in various combinations with one another or with other components not shown. These components might be located in a single physical entity or in more than one physical entity. Any actions described herein as being taken by the processor 32 might be taken by the processor 32 alone or by the processor 32 in conjunction with one or more components shown or not shown in the system 31. It will be appreciated that the data described herein can be stored in memory and/or in one or more databases.

Processor 32 executes instructions, codes, computer programs, or scripts that it might access from the network connectivity devices 33, RAM 34, ROM 35, or secondary storage 36 (which might include various disk-based systems such as hard disk, floppy disk, optical disk, or other drive). While only one processor 32 is shown, multiple processors 32 may be present. Thus, while instructions may be discussed as being executed by processor 32, the instructions may be executed simultaneously, serially, or otherwise by one or multiple processors 32. The processor 32 may be implemented as one or more CPU chips and/or application specific integrated chips (ASICs).

The network connectivity devices 33 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 33 may enable the processor 32 to communicate with the Internet or one or more telecommunications networks or other networks from which the processor 32 might receive information or to which the processor 32 might output information.

The network connectivity devices 33 might also include one or more transceiver components 38 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 38 might include separate receiving and transmitting units or a single transceiver. Information transmitted or received by the transceiver component 38 may include data that has been processed by the processor 32 or instructions that are to be executed by processor 32. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

RAM 34 might be used to store volatile data and perhaps to store instructions that are executed by the processor 32. The ROM 35 is a non-volatile memory device that typically has a smaller memory capacity than the memory capacity of the secondary storage 36. ROM 35 might be used to store instructions and perhaps data that are read during execution of the instructions. Access to both RAM 34 and ROM 35 is typically faster than to secondary storage 36. The secondary storage 36 is typically comprised of one or more disk drives or tape drives and might be used for non-volatile storage of data or as an over-flow data storage device if RAM 34 is not large enough to hold all working data. Secondary storage 36 may be used to store programs or instructions that are loaded into RAM 34 when such programs are selected for execution or information is needed.

The I/O devices 37 may include liquid crystal displays (LCDs), touchscreen displays, keyboards, keypads, switches, dials, mice, track balls, voice recognizers, card readers, paper tape readers, printers, video monitors, transducers, sensors, or other well-known input or output devices such as "glass cockpits." Also, transceiver component 38 might be considered to be a component of the I/O devices 360 instead of or in addition to being a component of the network connectivity devices 33. Some or all of the I/O devices 37 may be substantially similar to various components disclosed herein and/or may be components of a flight control system and/or other electronic systems of rotorcraft 10.

In some aspects, flight control computer 30 is preprogramed with certain parameters regarding the CG of rotorcraft 10 such that flight control computer can calculate the CG of rotorcraft 10. For example, flight control computer 30 knows an approximate location of the CG of rotorcraft 10 when rotorcraft 10 is empty (e.g., no pilot, no cargo, no passengers, etc.). A user can input additional load parameters into flight control computer 30 using I/O devices 37. For example, load parameters can include one or more of fuel parameters, passenger parameters, cargo parameters, and ballast parameters. Fuel parameters can include the location of the fuel within the aircraft and the fuel's weight. Passenger parameters can include the location of the passenger within the aircraft and the passenger's weight. Cargo parameters can include the location of the cargo within the aircraft and the cargo's weight. Ballast parameters can include the location of the ballast and the ballast's weight.

Figure 8:
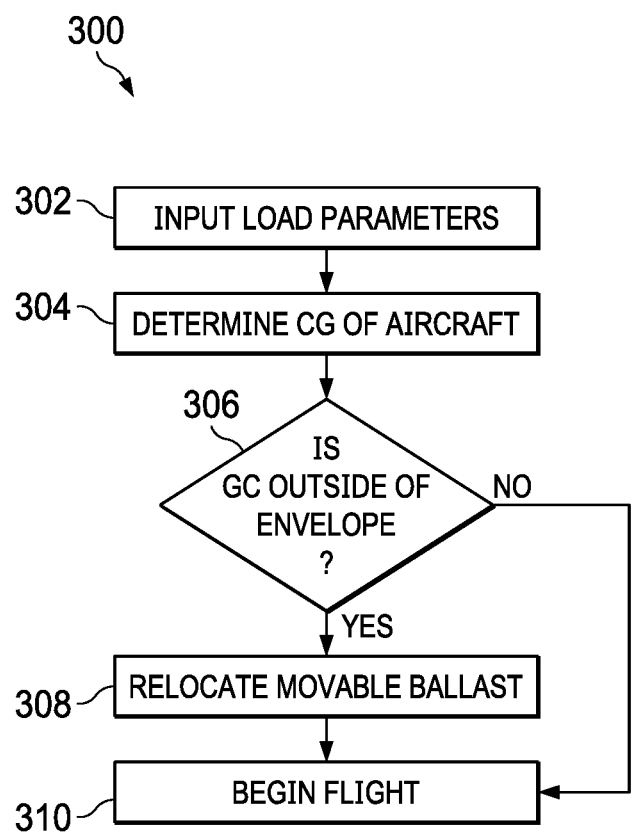
FIG. 8 is an illustrative method for moving a center of gravity of an aircraft.

FIG. 8 is an illustrative method 300 for setting a center of gravity of an aircraft. FIG. 8 is discussed relative to FIGS. 1-7. Method 300 begins at step 302. In step 302, load parameters are input into flight control computer 30. For example, a user (e.g., ground crew, pilot, co-pilot, etc.) inputs one or more of fuel parameters, passenger parameters, cargo parameters, and ballast parameters into flight control computer 30. In some aspects, each parameter that is entered describes a weight and a location of the weight within rotorcraft 10. The location of the weight can be described using coordinates (e.g., x, y, z) that are used by flight control computer 30 to calculate the CG of rotorcraft 10. The various parameters may be input using I/O devices 37. After load parameters are entered into flight control computer 30, method 300 proceeds to step 304.

In step 304, flight control computer 30 calculates the CG of rotorcraft 10, factoring in the load parameters entered in step 302. In step 306, the calculated CG is compared to the CG envelope of rotorcraft 10. Responsive to a determination that the calculated CG is outside of the CG envelope of rotorcraft 10, method 300 proceeds to step 308. Responsive to a determination that the calculated CG is within the CG envelope, method 300 proceeds to step 310.

In step 308, one or more movable ballasts 107-109 are relocated to fore/aft ballast docks 26, 28 to move the CG of rotorcraft 10. For example, if the calculated CG indicates a rearward CG, one or more movable ballasts 107-109 are moved to fore ballast dock 26. The farther rearward the CG is, the more weight from movable ballasts 107-109 will need to be moved. If the calculated CG indicates a forward CG, one or more movable ballasts 107-109 are moved to aft ballast dock 28. The farther forward the CG is, the more weight that needs to be moved via movable ballasts 107-109.

If, in step 306, a determination is made that the calculated CG is within the CG envelope, movable ballasts 107-109 do not need to be moved. However, in some aspects, the calculated CG may be within the CG envelope, but may be near a periphery of the CG envelope. In such a situation, despite the calculated CG being within the CG envelope, method 300 may optionally proceed to step 308 to move one or more of movable ballasts 107-109 to shift the CG of rotorcraft 10 to a more favorable position within the CG envelope that is not as close to the periphery of the CG envelope. This may be beneficial where, for example, the CG of rotorcraft 10 may change during flight as fuel burns off. Moving the CG of rotorcraft 10 to be more favorably placed within the CG envelope reduces a likelihood that the CG will transition out of the CG envelope during a flight.

After any changes to the positioning of movable ballasts have been made, method 300 proceeds to step 310 and rotorcraft 10 may begin its flight. In some aspects, method 300 is iterated. For example, method 300 may return to step 304 after completing step 308 to confirm that the relocation of one or more of movable ballasts 107-109 has improved the location of the CG a sufficient amount.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, as understood by a person of ordinary skill in the art. For example, within 1%, 2%, 3%, 5%, and 10% of what is specified herein.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method of adjusting a center of gravity (CG) of an aircraft, the method comprising:
   inputting at least one load parameter into a flight computer;
   determining, via a processer of the flight computer, the CG of the aircraft;
   responsive to a determination by the processor that the CG is outside of a CG envelope, moving at least a first movable ballast of a plurality of movable ballasts from a first ballast dock to a second ballast dock to move the CG toward the CG envelope; and
   wherein each of the first and second ballast docks comprise a housing and a first ballast tray secured within the housing, the first ballast tray comprising a plurality of channels.

2. The method of claim 1, wherein the at least one load parameter comprises one or more of a fuel parameter, a passenger parameter, a cargo parameter, and a ballast parameter.

3. The method of claim 1, wherein the at least one load parameter includes a weight and a location of the weight.

4. The method of claim 1, comprising:
determining, via a processer of the flight computer, the CG of the aircraft after the moving the at least the first movable ballast; and
responsive to a determination by the processor that the CG is still outside of a CG envelope, moving at least a second movable ballast of the plurality of movable ballasts from the first ballast dock to the second ballast dock to move the CG toward the CG envelope.

5. The method of claim 1, comprising responsive to a determination by the processor that the CG is inside of the CG envelope, moving at least the first movable ballast of the plurality of movable ballasts from the first ballast dock to the second ballast dock to move the CG away from a periphery of the CG envelope.

6. The method of claim 1, wherein the moving the first movable ballast comprises securing the first movable ballast in the second ballast dock with a pin that passes through bores of the housing and the first movable ballast.

7. The method of claim 1, wherein each channel of the plurality of channels comprises a different width and depth so that only one movable ballast of the plurality of movable ballasts can fit within a particular channel of the plurality of channels.

8. The method of claim 1, wherein each housing of the first and second ballast docks comprises a cut out configured to expose a portion of the plurality of movable ballasts when the plurality of movable ballasts are inserted into either of the first and second ballast docks.

9. The method of claim 1, wherein the plurality of movable ballasts comprises a first, second, and third ballast.

10. The method of claim 9, wherein the first and second ballasts have a first weight and the third ballast has a second weight.

11. The method of claim 9, wherein each movable ballast of the plurality of movable ballasts has a different weight.

12. The method of claim 1, wherein the first ballast dock is secured to the aircraft fore of the CG of the aircraft and the second ballast dock is secured to the aircraft aft of the CG of the aircraft.

13. The method of claim 1, wherein the first ballast dock is secured to the aircraft fore of the second ballast dock and the second ballast dock is secured aft of the CG of the aircraft.

14. The method of claim 13, wherein the first ballast dock is secured to the aircraft aft of the CG of the aircraft.

15. The method of claim 1, comprising
wherein each of the first and second ballast docks comprise a second ballast tray secured within the housing and comprising a plurality of channels; and
wherein opposing channels of the first and second ballast trays form bays configured to receive a movable ballast of the plurality of movable ballasts.

16. The method of claim 1, wherein the first ballast tray is made of a material selected from the group consisting of rubbers, plastics, and polymers.

17. The method of claim 1, wherein the first ballast tray is coated with a material selected from the group consisting of rubbers, plastics, and polymers.

* * * * *